United States Patent [19]

Stoffel et al.

[11] Patent Number: 5,401,303
[45] Date of Patent: Mar. 28, 1995

[54] AQUEOUS INKS HAVING IMPROVED HALO CHARACTERISTICS

[75] Inventors: John L. Stoffel; David H. Donovan, both of San Diego, Calif.; Loren E. Johnson; John R. Moffatt, both of Corvallis, Oreg.

[73] Assignee: E. I. Du Pont de Nemours and Company, Wilmington, Del.

[21] Appl. No.: 233,796

[22] Filed: Apr. 26, 1994

[51] Int. Cl.$^6$ ............................................. C09D 11/02
[52] U.S. Cl. ................................. 106/20 R; 106/22 R
[58] Field of Search ........................... 106/20 R, 22 R

[56] References Cited

U.S. PATENT DOCUMENTS

| | | | |
|---|---|---|---|
| 3,948,668 | 4/1976 | Hayek et al. | 106/22 R |
| 4,880,565 | 11/1989 | Rose et al. | 106/20 R |
| 5,019,166 | 5/1991 | Schwarz | 106/22 R |
| 5,108,504 | 4/1992 | Johnson et al. | 106/22 R |
| 5,198,023 | 3/1990 | Stoffel | 106/22 R |

FOREIGN PATENT DOCUMENTS

| | | | |
|---|---|---|---|
| 0580449A1 | 1/1994 | European Pat. Off. | |
| 56-49771 | 5/1981 | Japan | C09D 11/00 |
| 60-3434 | 1/1985 | Japan | C09D 11/00 |
| 61-235479 | 10/1986 | Japan | C09D 11/18 |
| 229470 | 1/1990 | Japan | C09D 11/00 |
| 4170474 | 6/1992 | Japan | C09D 11/00 |
| 4248880 | 9/1992 | Japan | C09D 11/00 |
| 4309573 | 11/1992 | Japan | C09D 11/00 |
| 6-1936 | 1/1994 | Japan | C09K 11/00 |
| 2131445B | 6/1986 | United Kingdom | |

*Primary Examiner*—Helene Klemanski

[57] ABSTRACT

Halo effect seen at the interface between a first ink, exhibiting sharp edge acuity, and a second ink, having low surface energy, is addressed by adding certain fluorocarbon compounds to the first ink. Edge acuity of the first ink is maintained.

25 Claims, No Drawings

AQUEOUS INKS HAVING IMPROVED HALO CHARACTERISTICS

FIELD OF THE INVENTION

This invention relates to printing two colors of aqueous inks, such as aqueous ink jet inks. More particularly, this invention relates to printing black and color inks adjacent to each other.

BACKGROUND OF THE INVENTION

Ink jet printing has become increasingly popular, particularly for so-called "desk-top publishing", because of its capability to produce small volumes of printed matter from digital input, at high throughput speeds. Recent equipment developments have led to the introduction of multi-color ink jet printers that integrate colored graphics and text. To some extent, however, the applications of ink jet printing have been limited due to the demanding requirements the inks must meet in order to provide high quality text and graphics.

Ideally, the ink used to print the text (generally black) will exhibit the sharp edge acuity needed to produce high print quality. One method of achieving sharp edge acuity is to select an ink that has relatively high surface energy; i.e., the ink will tend not to absorb into the printing media (generally paper), but leave the ink colorant (dye or pigment) on the media surface.

Another factor affecting ink selection is the tendency of inks to "bleed" when printed adjacent to one another. The problem of "bleeding" is particularly acute when the first ink has not yet dried when the next color is printed, which is the case in ink jet printing. One approach to minimizing bleed is to select inks having relatively low surface energy whereby the inks will rapidly absorb into the media, and thus be less affected by subsequent colors that are printed.

One approach to balancing the need for sharp edge acuity in the text, while minimizing bleed, has been to select a black ink exhibiting high surface energy for use with colored inks (typically cyan, magenta, and yellow) having low surface energies. Unfortunately, however, this approach is prone to produce a white or weakly colored region, referred to as "halo", at the interface of the black and colored inks. In some instances, one or more of the inks also may shrink back from their original printed areas. These tendencies of halo formation and shrinkage cause a loss of image optical density, and a loss of image quality, at the ink interface.

Thus, there is a need for improved inks that retain sharp edge acuity for printed text, have minimum bleed, and do not present the halo formation and shrinkage problems heretofore observed at the interface of black and colored inks.

SUMMARY OF THE INVENTION

It now has been found that halo formation, and shrinkage, at the interface of inks may be alleviated by the addition of certain fluorinated compounds to the ink exhibiting high surface energy in an amount sufficient to reduce its surface energy to within 15 dynes/cm of the low surface energy ink(s). Accordingly, the invention provides an ink set for printing at least two distinct colors on a print medium, the ink set comprising:

(a) a first ink exhibiting sharp edge acuity when printed on the medium, the ink containing at least one fluorinated compound of the formula:

$[R(f)Q]_n A$ wherein,

R(f) is a perfluoroalkyl group having 6 to 22 carbon atoms;
Q is a divalent bridging group;
A is a water-soluble group; and
n is 1 or 2,
in an amount effective to reduce the surface energy of the first ink to within approximately 15 dynes/cm of the second ink, thereby reducing halo effect, and (b) a second ink having a surface energy of less than 40 dynes/cm.

DETAILED DESCRIPTION OF THE INVENTION

The invention will now be described in detail with respect to the preferred embodiment of aqueous ink jet inks. It will be appreciated, however, that the invention has application to other inks and the term "ink", as used herein, generally refers to an aqueous carrier medium that contains a colorant, which may be a pigment dispersion or a dye, or a combination thereof. The ink formulated to obtain sharp edge acuity may contain either a dye or pigment as the colorant, and typically will exhibit a surface energy of approximately 72 to 50 dynes/cm prior to addition of the fluorinated anti-halo compound. Because of its high surface energy, the colorant will tend to remain on the surface of the printing media, rather than being absorbed into the media. A black colorant normally will be selected for this purpose, to provide printed text having high print quality.

The other inks used in conjunction with the black ink (typically cyan, magenta, and yellow) will be formulated to exhibit a surface energy typically in the range of 20 to 40 dynes/cm, and preferably less than 35 dynes/cm, in order that the inks will rapidly absorb into the printing media, and thus quickly dry to minimize bleed as adjacent ink is printed.

In accordance with the invention, it has been discovered that the halo and shrinkage effect heretofore observed at the interface of the high and low surface energy inks is alleviated or eliminated if certain fluorinated compound(s) are incorporated in the high surface energy ink to reduce its surface energy to within 15 dynes/cm, more preferably within 10 dynes/cm, of that exhibited by the low surface energy inks. Surprisingly, this reduction or elimination of halo may be achieved without unduly sacrificing the sharp edge acuity obtained by the high surface energy ink prior to addition of the fluorinated compound. The invention may be practiced to advantage with ink sets that include bleed control mechanisms such as those disclosed in U.S. Pat. Nos. 5,181,045 and 5,198,023.

INK COMPOSITION

As already mentioned above, aqueous ink jet inks employ an aqueous carrier medium and a colorant, which may be either a pigment dispersion, a dye, or combinations thereof. At least one of the inks contains a fluorinated anti-halo compound described in detail below. The inks may also contain other additives known in the art of ink jet printing. The first and second aqueous inks jet inks are chosen so that they are compatible and do not bleed when applied adjacent to or in contact with one another.

AQUEOUS CARRIER MEDIUM

The aqueous carrier medium is water or a mixture of water and at least one water soluble organic solvent. Selection of a suitable mixture depends on requirements of the specific application, such as desired surface tension and viscosity, the selected colorant, drying time of the ink, and the type of substrate onto which the ink will be printed. Representative examples of suitable water-soluble organic solvents are disclosed in U.S. Pat. No. 5,085,698. A mixture of water and a nitrogen containing cyclic compound, such as 2-pyrrolidone, is preferred as the aqueous carrier medium.

In the case of a mixture of water and a water-soluble solvent, the aqueous carrier medium usually contains from about 30% to about 95% water with the balance (i.e., 70 to 5%) being the water-soluble solvent. The preferred compositions are approximately 60% to about 95% water, based on the total weight of the aqueous carrier medium.

The amount of aqueous carrier medium in the ink is in the range of approximately 70 to 99.8%, preferably approximately 94 to 99.8%, based on total weight of the ink when an organic pigment is selected; approximately 25 to 99.8%, preferably approximately 70 to 99.8% when an inorganic pigment is selected; and 80 to 99.8% when a dye is selected.

COLORANTS

The colorant may be a pigment dispersion or a dye. A pigment is a colorant that is applied in an insoluble particulate state. A dye is a colorant that is applied in a soluble state.

PIGMENT DISPERSION:

The term "pigment dispersion" refers to a mixture of a pigment and a dispersing agent. Preferably, the dispersing agent is a polymeric dispersant compound.

Pigments:

Useful pigments include a variety of organic and inorganic pigments, alone or in combination, that are typically employed as colorants in ink compositions. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The typical range of useful particle size is approximately 0.005 micron to 15 micron. Preferably, the pigment particle size should range from 0.005 to 5 micron and most preferably, from 0.01 to 0.3 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be used in practicing the invention are disclosed in the aforementioned U.S. Pat. No. 5,085,698.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

Dispersant:

Polymeric dispersants are preferred for pigments. Polymeric dispersants suitable for practicing the invention include AB, BAB or ABC block copolymers.

In AB or BAB block copolymers, the A segment is a hydrophobic homopolymer or copolymer that serves to link with the pigment and the B block is a hydrophilic homopolymer or copolymer, or salts thereof, that serves to disperse the pigment in the aqueous medium. Such polymeric dispersants and the synthesis thereof are disclosed in Ma et al., U.S. Pat. No. 5,085,698.

ABC triblocks are also useful as pigment dispersants. In the ABC triblock, the A block is a polymer compatible with water, the B block is a polymer capable of binding to the pigment and the C block is compatible with the organic solvent. The A and C blocks are end blocks. ABC triblocks and their synthesis are disclosed in Ma et al., EPO application 0556649 A1 published Aug. 25, 1993.

Although random copolymers can be used as dispersing agents, they generally are not as effective in stabilizing pigment dispersions as the block polymers, and therefore are not preferred. Random interpolymers having narrowly controlled molecular weight ranges, preferably having poly dispersivities of 1-3, may be selected. These polymers are substantially free of higher molecular weight species that readily plug pen nozzles. Number average molecular weight must be less than 10,000 Daltons, preferably less than 6,000, most preferably less than 3,000. These random polymers contain random hydrophobic and hydrophilic monomer units. Commercial random dispersant polymers will plug pen nozzles readily. The needed molecular weight control can be obtained by using the Group Transfer Polymerization technique, but other methods that deliver low dispersivity also may be employed.

Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl [meth]acrylate and salts thereof. Also quaternary salts of dimethylaminoethyl [meth]acrylate may be employed.

DYES:

The dye may be anionic, cationic, amphoteric or non-ionic. Such dyes are well known in the art. Anionic dyes yield colored anions, and cationic dyes yield colored cations in aqueous solution. Typical anionic dyes contain carboxylic or sulfonic acid groups as the ionic moiety and encompass all acid dyes. Cationic dyes usually contain quaternary nitrogen groups, and encompass all basic dyes.

Anionic dyes most useful in this invention are Acid, Direct, Food, Mordant, and Reactive dyes. Anionic dyes typically are nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds or phthalocyanine compounds.

Cationic dyes most useful in this invention are the basic dyes and mordant dyes designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well known in the art.

The color and amount of dye used in the ink composition is largely a function of choice, being primarily dependent upon the desired color of the print achieved with the ink, the purity of the dye and its strength. Low concentrations of dye may not give adequate color vividness. High concentrations may result in poor printhead performance or unacceptably dark colors. The dye is present in the amount of 0.01 to 20%, preferably 0.05 to 8%, and most preferably 1 to 5%, by weight, based on the total weight of the ink.

In the case of organic pigments, the ink may contain up to approximately 30% pigment by weight for some applications, but will generally be in the range of 0.1 to 15%, preferably 0.1 to 8%, by weight of the total ink composition. If an inorganic pigment is selected, the ink will tend to contain higher weight percentages of pigment than with comparable inks employing organic pigment, and may be as high as 75% in some cases, because inorganic pigments generally have higher specific gravities than organic pigments.

FLUORINATED ANTI-HALO COMPOUNDS

The fluorinated compound may be nonionic, anionic, cationic, or amphoteric, and is represented by the formula:

wherein $R(f)$ is a perfluoroalkyl group having 6 to 22 carbon atoms; Q is a divalent bridging group capable of connecting the $R(f)$ with the A group, A is a water soluble group and n is 1 or 2. The bridging Q group may be a diradical of alkyl, aralkyl, alkylaryl, or aryl containing less than 10 carbon atoms, and may contain heteroatoms such as S, O, and N. The linkage between the bridging Q group and the water-soluble A group may be ether, ester, amide, or sulfoamido provided it is stable under the conditions of use. The water-soluble A group may be selected from $-(OCH_2CH_2)_xOH$ wherein x is 1 to 12; $-COOM$ and $-SO_3M$ wherein M is hydrogen, ammonium, amine, or an alkali metal such as lithium, sodium, or potassium; $-PO_4(Z)_y$ wherein y is 1-2 and Z is hydrogen, ammonium, amine, or an alkali metal such as lithium, sodium, or potassium; $-NR_3X$ wherein $R_3$ is an alkyl group of 1 to 4 carbon atoms and X is an anionic counterion selected from the group consisting of halides, acetates, and sulfonates, and other water-soluble zwitterionic groups. The balance between the size of the perfluoroalkyl group and the water-soluble group should be such that the compound as a whole has a solubility in the desired aqueous carrier medium of at least 0.01% at 25° C., preferably at least 0.05% at 25° C. Suitable fluorinated compounds are commercially available from E. I. du Pont de Nemours and Company (Wilmington, Del.) as Zonyl ®, and from 3M Company (Minneapolis, Minn.) as Fluorad ®, which may be used alone or in combinations. The specific compound(s) selected will vary with other components in the ink and the properties of the ink printed adjacent to it. It is important that the ionic character of the selected fluorinated compound be compatible with other components in the inks to avoid precipitation or flocculation.

Some examples of suitable fluorinated anti-halo compounds are shown in Table 1:

TABLE 1

| FLUORINATED ANTI-HALO COMPOUND | R(f) | Q | A | n |
|---|---|---|---|---|
| 1 | $F(CF_2CF_2)_{3-8}$ | $CH_2CH_2SCH_2CH_2$ | $CO_2Li$[a] | 1 |
| 2 | $F(CF_2CF_2)_{3-8}$ | $CH_2CH_2$ | $PO_4(NH_4)_2$ | 1 |
| 3 | $F(CF_2CF_2)_{3-8}$ | $CH_2CH_2$ | $PO_4NH_4$ | 2 |
| 4 | $F(CF_2CF_2)_{3-8}$ | $CH_2CH_2$ | $(OCH_2CH_2)_xOH$[b] | 1 |

[a] Counter ions other than lithium and ammonium are also useful.
[b] x is 1-12

The fluorinated anti-halo compound may be present in the amount of 0.005 to 3% by weight, preferably 0.01 to 1% by weight, and most preferably 0.01 to 0.15% by weight, based on total weight of the ink to effectively adjust the surface energy. The selected concentration will vary with the ink system, efficiency of the fluorinated compound to reduce halo, properties of companion ink(s), and the intended media. Generally, sufficient fluorinated compound will be added to adjust the surface energies to within 15 dynes/cm, preferably within 10 dynes/cm. Addition of too much fluorinated compound may affect edge acuity, and should be avoided.

OTHER INGREDIENTS

The ink compositions may also contain biocides to inhibit growth of microorganisms and sequestering agents, such as EDTA, to eliminate deleterious effects of heavy metal impurities. Other additives, such as humectants, viscosity modifiers and polymers also may be included to improve various properties of the ink compositions as is known in the art.

The ink compositions are prepared in the same manner as other ink jet ink compositions. If a pigment dispersion is used as the colorant, the dispersion may be prepared by premixing the selected pigment(s) and dispersant in water. The dispersion step may be accomplished in a horizontal mini mill, a ball mill, an attritor, a 2-roll mill, or by passing the mixture through a plurality of nozzles within a liquid jet interaction chamber at a liquid pressure of at least 5000 psi to produce a uniform dispersion of the pigment particles in the aqueous carrier medium. Other cosolvents may be present during the dispersion step. If a dye is used as the colorant, the ink can be prepared in a well agitated vessel rather than in dispersing equipment.

INK PROPERTIES

Jet velocity, separation length of the droplets, drop size and stream stability are greatly affected by the surface tension and the viscosity of the ink. Pigmented ink jet inks suitable for use with ink jet printing systems typically have viscosities no greater than 20 cP, and preferably in the range of about 1.0 cP to about 10.0 cP at 20° C. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. The inks have excellent storage stability for a long period and do not clog in an ink jet apparatus. Fixing of the ink on the image recording material, such as, paper, fabric, film, etc., can be carried out speedily and surely. The printed ink images have clear color tones, high density, excellent water resistance and light fastness. Further, the ink does not corrode parts of the ink jet printing device it comes in contact with, and it is essentially odorless, and nontoxic.

PRINTING MEDIUM

The inks may be used with the various media commonly used to receive printed information. Cellulose type media are normally selected in ink jet printing, but non-cellulose media may be selected for particular applications. If sized, the degree of sizing is generally in the range of 1 second to 1000 seconds as measured by the Hercules size test (HST), as described in TAPPI standards T530 PM-83. The medium is chosen so its HST value is compatible with the volume and composition of the ink drop in the printer to be used. The preferred HST is in the range of 200 to 500 seconds, most preferably 350 to 400 seconds. Some useful papers include copier grade paper, 100% bleached kraft composed of a blend of hard and soft wood, 100% wood free cotton vellum, and wood containing paper made translucent either by pulp beating or with additives. A preferred paper is Gilbert Bond paper (25% cotton) designated style 1057, manufactured by Mead Company, Dayton, Ohio. Other useful media include cardboard, transparent films such as polyethylene terephthalate, coated transparent films, fabrics, etc.

EXAMPLES

The following examples, wherein parts and percentages are by weight, illustrate but do not limit the invention.

Polymer Preparation:

The triblock polymer ETEGMA//BzMA//MAA (4//15//12) was prepared using the following procedure: Preparation of poly(methacrylic acid-b-benzyl methacrylate-co-methylmethacrylate-b-ethoxytriethylene glycol methacrylate), MAA//BzMA//ETEGMA (12//15//4) (Note: A double slash indicates a separation between the blocks and a single slash indicates a random copolymer. The values recited in parenthesis represent the degree of polymerization for each monomer.)

To a solution of 170.8 g (0.73 mol) of 1,1-bis(trimethylsiloxy)-2-methyl-1-propene and 5.3 mL of tetrabutyl ammonium m-chlorobenzoate (1.0M solution in acetonitrile) in 3500 g THF was slowly added 1396.2 g (8.84 mol) of trimethylsilyl methacrylate in 35 minutes under nitrogen atmosphere. The temperature rose from 22.1° C. to 54.7° C. When the temperature fell to 46.4° C., 20 minutes later, 0.5 mL of tetrabutyl ammonium m-chlorobenzoate solution was added. No exotherm was detected. To the reaction mixture was then slowly added 1943.0 g (11.0 mol) of benzyl methacrylate (dried over molecular sieves) in 30 minutes. The temperature rose to 63.2° C. during the course of the addition. When the temperature fell to 58.2° C. about 30 minutes later, 0.5 mL of tetrabutyl ammonium m-chlorobenzoate was added and no exotherm was detected. To the reaction mixture was then added 733.0 g (2.98 mol) of ethoxytriethyleneglycol methacrylate (dried over molecular sieves) over 10 minutes. The reaction mixture was stirred overnight. It was quenched with 613 g of methanol. The volatiles were stripped off by distillation while 2-pyrrolidone was added to displace the solvent to give a polymer solution at 44.2% solids.

The block polymer was neutralized using the following procedure: 791.9 g of the polymer solution were mixed with 99.3 g of potassium hydroxide solution (45.9% in deionized water) and 2608.8 g of deionized water until a homogeneous 10% polymer solution was obtained.

Pigment Dispersion Preparation

A black pigment dispersion was prepared using the following procedure:

| Ingredient | Amount (parts by weight) |
| --- | --- |
| FW18, Carbon black pigment (Degussa Corp., Allendale, NJ 07041) | 60.6 |
| Polymer obtained from above, (10% solution) | 300.0 |
| Deionized water | 240.0 |
| Total | 600.0 |

The above mentioned components were premixed in a plastic beaker by mechanical stirring until no lumps or dry clumps were visible. The mixture was dispersed in a microfluidizer (Microfluidics Corp., Watham, Mass.) by passing it through the interaction chamber 5 times under a liquid pressure of about 8,000 psi. The resulting pigment dispersion had a 10% pigment concentration with an average particle size of 106 nm as determined by Brookhaven BI-90 particle sizer. The dispersion was filtered through a 1 micron high efficiency filter bag (3M Filtration Products, St. Paul, Minn. 55144-1000). The final pH was 7.8.

Ink Preparation

Inks were prepared using the following procedures.

Black Ink B1

An ink containing 3.5% pigment and 1.75% polymer dispersant was prepared by stirring together 35 grams of dispersion with the appropriate quantities of Liponics® EG-1, obtained from Lipo Chemicals, Inc., Paterson, N.J., 2-Pyrrolidinone, and Nuosept® 95, Huls America, Inc., Piscataway, N.J., to make an ink with final concentrations of 8% Liponics® EG-1, 10% 2-Pyrrolidinone, and 0.3% Nuosept® 95.

Black Ink B2

An ink containing 3.5% pigment and 1.75% polymer dispersant was prepared by stirring together 35 grams of dispersion with the appropriate quantities of Liponics® EG-1, 2-Pyrrolidinone, and Nuosept® 95 to make an ink with final concentrations of 8% Liponics® EG-1, 10% 2- Pyrrolidinone, 0.175% fluorinated antihalo compound 2 and 0.3% Nuosept® 95.

Black Ink B3

An ink containing 3.5% pigment and 1.75% polymer dispersant was prepared by stirring together 35 grams of dispersion with the appropriate quantities of Liponics® EG-1, 2-Pyrrolidinone, and Liponics® EG-1, 10% 2-Pyrrolidinone, 0.4% Fluorad® FC-170C, manufactured by 3M Company, Minneapolis, Minn., and 0.3% Nuosept® 95.

Black Ink B4

An ink containing 3.5% pigment and 1.75% polymer dispersant was prepared by stirring together 35 grams of dispersion with the appropriate quantities of Liponics® EG-1, 2-Pyrrolidinone, and Nuosept® 95 to make an ink with final concentrations of 8% Liponics® EG-1, 10% 2- Pyrrolidinone, 0.075% fluorinated antihalo compound 1 and 0.3% Nuosept® 95.

Black Ink B5

40 grams of a black ink was prepared by stirring together 4.5 grams of a Food Black 2 dye solution (10 wt %), 2.4 grams of 2-Pyrrolidinone, 0.005 grams of fluorinated anti-halo compound 1, and 33.08 grams of deionized water.

Black Ink B6

40 grams of a black ink were prepared by stirring together 4.5 grams of a Food Black 2 dye solution (10 wt %), 2.4 grams of 2-Pyrrolidinone, and 33.1 grams of deionized water.

Color Ink C1

A yellow ink was prepared by adding 2% Acid Yellow 23 to an aqueous solution containing 15% 2-ethyl-2-hydroxymethyl-1.3-propanediol; 7% Calcium nitrate tetrahydrate, 8%1,5 pentanediol, and 1.5% oleoamine oxide.

Color Ink C2

A cyan ink was prepared by adding 2% Acid Blue 9 to an aqueous solution containing 15% 2-ethyl-2-hydroxymethyl-1.3-propanediol; 7% Calcium nitrate tetrahydrate, 8% 1,5 pentanediol, and 1.5% oleoamine oxide.

Color Ink C3

40 grams of a cyan ink were prepared by stirring together 5.5 grams of an Acid Blue 9 dye solution (10 wt %), 2.4 grams of 2-Pyrrolidinone, 0.8 grams of n-butanol, 2.8 grams of Calcium nitrate tetrahydrate, and 28.5 grams of deionized water.

Color Ink C4

40 grams of a yellow ink were prepared by stirring together 5.5 grams of an Acid Yellow 23 dye solution (10 wt %), 2.4 grams of 2-Pyrrolidinone, 0.8 grams of n-butanol, 2.8 grams of Calcium nitrate tetrahydrate, and 28.5 grams of deionized water.

CONTROL 1

A 20 gram sample of the Black Ink B1 was filled into a reservoir of a thermal ink jet print cartridge with a 35 micron square resistor and a 27 micron orifice opening. Approximately 15 grams of yellow ink were then added to the ink reservoir of a 30/25 resistor/orifice print cartridge, and 15 grams of cyan ink were added to another 30/25 resistor orifice print cartridge. The cartridges were then loaded into a 4 cartridge inkier printer mechanism. A sample was then printed on two plain papers that showed poor halo performance. The sample consisted of a color border surrounding a black area fill where the color inks were in abutting relationship to the black ink. The color border was green consisting of one drop of yellow, Color ink C1 and one drop of cyan, Color ink C2 per pixel location. The sample was printed using a 2 pass 100% fill print mode. Halo was rated visually by comparison to a set of standard samples showing varying degrees of halo. These standards were used to define a rating scale of 1 to 7 where 1 was no visible halo, and a 7 was a white gap in excess of 1 millimeter appearing at the edge of the black area where it abutted the color area. Scores of 3 or greater were unacceptable.

Edge acuity is closely associated with human perceived print quality. Other significant factors are optical density and print resolution. Since these latter factors remained constant in these controls and examples, perceived print quality was used as a measure of edge acuity. To measure print quality, a second sample page was printed consisting of several lines of text in a New Times Roman 10 point font. Each page was compared to standard text print samples containing the same text and font, which had been previously graded by a trained committee of people. The scale used has scores ranging from 1 to 7, with a 7 being best, and a 1 being worst. Rating differences of greater than half a point were considered significant. A score of 3 was considered marginally acceptable.

The control shows good print quality with poor halo performance. The results are shown in Table 1.

Example 1

Control 1 was repeated with the exception that Black Ink B2 was used in place of Black Ink B1. Results are shown in Table 1.

Example 2

Control 1 was repeated with the exception that Black Ink B3 was used in place of Black Ink B1. Results are shown in Table 1.

Example 3

Control 1 was repeated with the exception that Black Ink B4 was used in place of Black Ink B1. Results are shown in Table 1.

TABLE 1

| CONTROL/ EXAMPLE # | BLACK INK | COLOR INKS | HALO GB | HALO AR | TEXT PQ SH | TEXT PQ HM | TEXT PQ GB |
|---|---|---|---|---|---|---|---|
| Control 1 | B1 | C1,C2 | 4 | 7 | 5.5 | 4.6 | 5.8 |
| Example 1 | B2 | C1,C2 | 1 | 1 | 5.9 | 3.0 | 6.0 |
| Example 2 | B3 | C1,C2 | 1.5 | 2 | 4.7 | 3.7 | 6.3 |
| Example 3 | B4 | C1,C2 | 1 | 1 | 5.6 | 4.0 | 6.2 |

GB = Gilbert Bond ® paper
AR = Aussedat-Rey Reymat ® paper
HM = Hammermill ® Fore DP paper
SH = Springhill ® Relay DP paper The ink set of Control 1 displays clearly unacceptable halo, but has good text PQ. The ink sets of Examples 1-3 have no halo and similar text print quality to Control 1.

CONTROL 2

20 grams of black ink B6 were filled in an empty Hewlett-Packard HP51626A print cartridge. 10 grams each of color inks C3 and C4 were filled in appropriate chambers of an empty Hewlett-Packard HP51625A 3-color print cartridge. Both cartridges were loaded into a Hewlett-Packard 550C inkjet printer.

An Aldus Freehand file was created which contained text in a 10 point Times New Roman font, and color blocks with a black border to evaluate halo performance. The color blocks are ½ inch squares of 100% area fill, surrounded by a 3/16 inch black border, which abuts the color block. Yellow, green, and cyan color blocks were included in the file.

The file was printed on three brands of plain paper, Hammermill Fore DP, Springhill Relay DP, and Aussedat-Rey Reymat 80, using the Hewlett-Packard 550C printer with the 3.10 Version Windows Deskjet 550C printer driver, set for plain paper, normal quality, optimal black text settings. Printing the file took approximately 50 seconds per page.

Text print quality was rated visually by comparison to a set of standards containing the same 10 point Times New Roman font. These standards had been previously prepared by having a group of people rate them on a scale of 1 to 7, with a 7 being best, and a 1 being worst. Rating differences of greater than half a point were considered significant. A score of 3 was considered marginally acceptable.

Halo was rated visually by comparison to a set of standard samples showing varying degrees of halo. These standards were used to define a rating scale of 1 to 7 where 1 was no visible halo, and a 7 was a white gap in excess of 1 millimeter appearing at the edge of the black border where it abutted the color block. Scores of 3 or greater were unacceptable.

Results of Control 2 can be found in Table 2 below.

Example 4

20 grams of black ink B5 were filled in an empty Hewlett-Packard HP51626A print cartridge. 10 grams each of color inks C3 and C4 were filled in appropriate chambers of an empty Hewlett-Packard HP51625A 3-color print cartridge. Both cartridges were loaded in a Hewlett-Packard 550C inkjet printer. Print samples were generated and rated using the same procedures described under Control 2. As can be seen in the results for Example 4 in Table 2, halo was imperceptible, while print quality remained the same as in Control 2.

TABLE 2

| Atttribute | Black Ink | Color Ink | Attribute scores, by paper | | |
|---|---|---|---|---|---|
| | | | AR | SH | HM[1] |
| CONTROL 2 | | | | | |
| Black Text[2] | B6 | | 3.7 | 2.0 | 3.0 |
| Halo[3] (Cyan) | B6 | C3 | 7 | 6 | 4 |
| Halo (Green) | B6 | C3,C4 | 7 | 3 | 4 |
| Halo (Yellow) | B6 | C4 | 7 | 2 | 3 |
| EXAMPLE 4 | | | | | |
| Black Text | B5 | | 3.5 | 2.5 | 3.2 |
| Halo (Cyan) | B5 | C3 | 1 | 1 | 1 |
| Halo (Green) | B5 | C3,C4 | 1 | 1 | 1 |
| Halo (Yellow) | B5 | C4 | 1 | 1 | 1 |

[1] AR = Aussedat-Rey Reymat ® paper
SH = Springhill ® Relay DP paper
HM = Hammermill ® Fore DP paper
[2] Black Text Scale -
1 = poor, 3 = marginally acceptable, 7 = very good
[3] Halo Scale -
1 = none, 3 = unacceptable, 7 very poor

What is claimed is:

1. An ink set for printing at least two distinct colors on a print medium, said ink set comprising:
   (a) a first ink exhibiting sharp edge acuity when printed on said medium, said ink containing at least one fluorinated compound of the formula:

$[R(f)Q]_n A$ wherein,
   R(f) is a perfluoroalkyl group having 6 to 22 carbon atoms;
   Q is a divalent bridging group;
   A is a water-soluble group; and
   n is 1 or 2,
   in an amount effective to reduce the surface energy of the first ink to within approximately 15 dynes/cm of a said second ink, thereby reducing halo effect, and
   (b) a second ink having a surface energy of less than 40 dynes/cm.

2. The ink set of claim 1 wherein said first ink contains approximately 0.005 to 3% by weight of said fluorinated compound.

3. The ink set of claim 2 wherein said first ink is black.

4. The ink set of claim 2 wherein said inks are particularly adapted for use in an ink jet printer.

5. The ink set of claim 1 wherein the amount of said fluorinated compound is present in an effective amount to reduce the surface energy of said first ink to within approximately 10 dynes/cm of said second ink.

6. The ink set of claim 5 wherein said first ink contains approximately 0.01 to 0.15% by weight of said fluorinated compound.

7. The ink set of claim 1 wherein A is a terminal group selected from the group consisting of $-(OCH_2CH_2)_x OH$ wherein x is 1 to 12; $-COOM$ and $-SO_3M$ wherein M is selected from the group of hydrogen, ammonium, amines, and alkali metals; $-PO_4(Z)_y$ wherein y is 1-2 and Z is selected from the group consisting of hydrogen, ammonium, amines, and alkali metals; $-NR_3X$ wherein $R_3$ is an alkyl group of 1 to 4 carbon atoms and X is an anionic counterion selected from the group consisting of halides, acetates, sulfonates, and water-soluble zwitterionic groups.

8. The ink set of claim 1 wherein Q is selected from the group consisting of a diradical of alkyl, aralkyl, alkylaryl, and aryl containing less than 10 carbon atoms.

9. The ink set of claim 1 wherein R(f) is $F(CF_2CF_2)_{3-8}$, Q is $CH_2CH_2SCH_2CH_2$, A is $CO_2Li$ and n is 1.

10. The ink set of claim 1 wherein R(f) is $F(CF_2CF_2)_{3-8}$, Q is $CH_2CH_2$, A is $PO_4(NH_4)_2$ and n is 1.

11. The ink set of claim 1 wherein R(f) is $F(CF_2CF_2)_{3-8}$, Q is $CH_2CH_2$, A is $PO_4NH_4$ and n is 2.

12. The ink set of claim 1 wherein said first ink is a black ink, and said second ink is cyan, magenta or yellow.

13. A process for applying or printing at least two distinct colors on a print medium wherein halo between said two distinct colors is alleviated, comprising:
   (1) printing a first ink that exhibits sharp edge acuity when printed on said medium, said ink containing a fluorinated compound of the formula:

$[R(f)Q]_n A$ wherein,
   R(f) is a perfluoroalkyl group having 6 to 22 carbon atoms;
   Q is a divalent bridging group;
   A is a water-soluble group; and
   n is 1 or 2,
   in an amount effective to reduce the surface energy of said first ink to within approximately 15 dynes/cm of a second ink, thereby reducing halo effect, and
   (2) printing adjacent to said first ink a second ink having a surface tension less than 40 dynes/cm.

14. The process of claim 13 including the steps of printing additional inks that have a surface tension of less than 40 dynes/cm.

15. The process of claim 13 wherein said first ink contains approximately 0.005 to 3% by weight of said fluorinated compound.

16. The process of claim 13 wherein said first ink is black.

17. The process of claim 13 conducted by an ink jet printer.

18. The process of claim 13 wherein the amount of said fluorinated compound is present in an effective amount to reduce the surface energy of said first ink to within approximately 10 dynes/cm of said second ink.

19. The process of claim 13 wherein said first ink contains approximately 0.1 to 0.15% by weight of said fluorinated compound.

20. The process of claim 13 wherein in the fluorinated compound in said first ink, A is a terminal group selected from the group consisting of $-(OCH_2CH_2)_xOH$ wherein x is 1 to 12; $-COOM$ and $-SO_3M$ wherein M is selected from the group of hydrogen, ammonium, amines, and alkali metals; $-PO_4(Z)_y$ wherein y is 1–2 and Z is selected from the group consisting of hydrogen, ammonium, amines, and alkali metals; $-NR_3X$ wherein $R_3$ is an alkyl group of 1 to 4 carbon atoms and X is an anionic counterion selected from the group consisting of halides, acetates, sulfonates, and water-soluble zwitterionic groups.

21. The process of claim 13 wherein in the fluorinated compound in said first ink, Q is selected from the group consisting of a diradical of alkyl, aralkyl, alkylaryl, and aryl containing less than 10 carbon atoms.

22. The process of claim 13 wherein in the fluorinated compound in said first ink, R(f) is $F(CF_2CF_2)_{3-8}$, Q is $CH_2CH_2SCH_2CH_2$, A is $CO_2Li$ and n is 1.

23. The process of claim 13 wherein in the fluorinated compound in said first ink, R(f) is $F(CF_2CF_2)_{3-8}$, Q is $CH_2CH_2$, A is $PO_4(NH_4)_2$ and n is 1.

24. The process of claim 13 wherein in the fluorinated compound in said first ink, R(f) is $F(CF_2CF_2)_{3-8}$, Q is $CH_2CH_2$, A is $PO_4NH_4$ and n is 2.

25. The process of claim 13 wherein a mixture of fluorinated compounds having said formula is included in the first ink.

* * * * *